(12) United States Patent
Wang et al.

(10) Patent No.: US 11,411,635 B2
(45) Date of Patent: Aug. 9, 2022

(54) SPATIAL REUSE IN WLAN MULTI-AP NETWORK

(71) Applicant: MediaTek Singapore Pte. Ltd., Solaris (SG)

(72) Inventors: James June-Ming Wang, San Jose, CA (US); Thomas Edward Pare, Jr., San Jose, CA (US); Yongho Seok, San Jose, CA (US); Gabor Bajko, San Jose, CA (US); Jianhan Liu, San Jose, CA (US); Tianyu Wu, San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 590 days.

(21) Appl. No.: 16/351,236

(22) Filed: Mar. 12, 2019

(65) Prior Publication Data

US 2019/0288767 A1   Sep. 19, 2019

Related U.S. Application Data

(60) Provisional application No. 62/644,631, filed on Mar. 19, 2018.

(51) Int. Cl.
| | |
|---|---|
| *H04B 7/14* | (2006.01) |
| *H04B 7/0452* | (2017.01) |
| *H04W 16/12* | (2009.01) |
| *H04W 52/24* | (2009.01) |
| *H04L 27/26* | (2006.01) |
| *H04W 84/12* | (2009.01) |

(52) U.S. Cl.
CPC ............ *H04B 7/14* (2013.01); *H04B 7/0452* (2013.01); *H04L 27/2626* (2013.01); *H04W 16/12* (2013.01); *H04W 52/24* (2013.01); *H04W 84/12* (2013.01)

(58) Field of Classification Search
CPC ..... H04B 7/14; H04B 7/0452; H04L 27/2626; H04W 16/12; H04W 52/24; H04W 84/12
USPC ........................................................ 370/315
See application file for complete search history.

(56) References Cited

U.S. PATENT DOCUMENTS

| | | | |
|---|---|---|---|
| 2002/0044594 A1* | 4/2002 | Bongfeldt | .......... H04B 7/15535 375/213 |
| 2006/0217076 A1 | 9/2006 | Bishop | |
| 2010/0067427 A1* | 3/2010 | Choudhury | ........ H04B 7/15542 370/315 |

(Continued)

*Primary Examiner* — Chi Tang P Cheng

(57) ABSTRACT

Systems and methods of WLAN communication including efficient spatial reuse mechanisms for relay transmissions between a repeater network and non-AP STAs in OFDMA. The non-AP STAs are grouped based on their connectivity with the individual repeaters and the radio coverage regions of the repeaters. Each group is either a non-overlapping group with the constituent non-AP STAs located in a non-overlapping coverage region of a particular repeater, or an overlapping group with the constituent non-AP STAs located in an overlapping coverage region of two or more repeaters. Based on the grouping, certain RUs (or subchannels) are reused for multiple groups without causing inter-group interference, thereby expanding the bandwidths used in the relay operations. RU allocation based on grouping can be used in combination with transmit power adjustment to achieve efficient spatial reuse in OFDMA.

23 Claims, 10 Drawing Sheets

(56) References Cited

U.S. PATENT DOCUMENTS

2015/0264578 A1* 9/2015 Chaves ................ H04W 16/14
370/338
2017/0196010 A1* 7/2017 Matsuo ............. H04W 72/0453
2017/0303280 A1 10/2017 Chun et al.

* cited by examiner

SPATIAL REUSE IN WLAN MULTI-AP NETWORK

CROSSREFERENCE TO RELATED APPLICATION

This patent application claims priority and benefit of U.S. Provisional Patent Application No. 62/644,631, entitled "11ax REPEATER AND SPATIAL REUSE OPERATION," filed on Mar. 19, 2018, the entire content of which is herein incorporated by reference for all purposes.

TECHNICAL FIELD

Embodiments of the present disclosure relate generally to the field of Wi-Fi network communication, and more specifically, to the field Wi-Fi repeater network communication mechanisms.

BACKGROUND OF THE INVENTION

In a wireless local area network (WLAN), one or more repeater access points (or "repeaters" herein) can be placed within radio range of an access point (APs) connected to the wired LAN to extend the range of an infrastructure or to overcome an obstacle that blocks radio communication. A repeater, also known as a booster or an extender, is capable of relaying both uplink (UL) and downlink (DL) traffic between the wireless user devices (or non-AP STAs) and the AP. A repeater can also act as a Port-Control-Protocol (PCP) AP without wired LAN connection to the other STAs in which it relays data to.

DL and UL user aggregation is an effective technology to increases network efficiency. Orthogonal Frequency-Division Multiple Access (OFDMA) can be used for synchronized data transmission between multiple repeaters in a repeater network with the non-AP STAs. In a densely deployed WLAN environment, it is common to have multiple repeaters located in a close range and simultaneous transmission to and from the repeaters may cause interference due to the overlapping coverage regions. To avoid transmission interference among the repeaters, they usually are allocated with completely different RUs, particularly resource units (RUs). Thus, a repeater is usually only limited to using the allocated RUs for relay transmissions with the non-AP STAs and cannot use the full bandwidth that an AP provides. As a result, the links between the AP and the repeaters typically have much higher throughput than the links between the repeaters and the non-AP STAs. Similarly, neighboring APs with overlapping coverage region would be subject to transmission interference in the overlapping region.

SUMMARY OF THE INVENTION

Embodiments of the present disclosure provide a spatial reuse mechanism that enables a repeater network to efficiently use the resource units of a wireless local area network (WLAN) while avoiding interference among the coordinating devices (e.g., repeaters) in Orthogonal Frequency-Division Multiple Access (OFDMA) transmissions, thereby enhancing overall throughput of the network.

Embodiments of the present disclosure include grouping the non-STAs in a WLAN based on their locations with respect to the repeaters' radio coverage regions and accordingly identifying certain RUs (or sub-channels or resource units) that can used by multiple repeaters in an OFDMA relay transmission without causing interference. More specifically, an overlapping coverage region of each particular set of multiple repeaters (e.g., a set of neighboring repeaters) is identified as an overlapping zone, and the one or more STAs in this zone are assigned as an overlapping group. A region that is covered solely by a single repeater is identified as a non-overlapping zone, and the one or more STAs in this zone are assigned as a non-overlapping group. The grouping may be based on received power ratios from different repeaters (i.e., signal-to-interference ratios or signal-to-interference plus noise ratios) provide by individual receiver STAs or based on a form of channel status information (CSI) that is generated responsive to sounding signals from the transmitter STAs. The OFDMA transmission may be an uplink transmission from the non-AP STAs to the repeater network, or a downlink transmission from the repeater network to the non-AP STAs. The uplink grouping and downlink grouping for the WLAN may be different. A preferred method of classification between the non-overlapping and overlapping groups is based on a predetermined threshold of a selected metric. However, the present disclosure is not limited to any specific method in which the information for the classification is obtained and communicated among the devices.

In a scenario an OFDMA relay transmission involves communication between both non-overlapping and overlapping groups and at least two repeaters, a first set of resource units (RUs) is allocated to a first non-overlapping group (e.g., for communication with a first repeater), and a second set of resource units (RUs) is allocated to the overlapping group (e.g., for communication with a second repeater). The first and the second sets of RUs are exclusive of each other to avoid inter-group interference. Further, the first set of RUs can be reused for a second non-overlapping group to communicate with the second repeater in the same OFDMA relay communication.

In some embodiments, the second set of RUs may also be reused for the first non-overlapping group to communicate with the first repeater, and interference can be prevented by adjusting the transmit power, e.g., based on a Spatial Reuse Parameters (SRP). The Spatial Reuse Parameters (SRP) is currently used in IEEE 802.11ax standards and specifications for transmit power adjustment by a spatial reuse overlapping basic service set (OBSS) station in a SRP-based Spatial Reuse transmission for the uplink TB (trigger-based) PPDU transmission. According to embodiments of the present disclosure, SRP-based Spatial Reuse transmission can be used in other types of PPDU transmission as well.

In a scenario that an OFDMA relay transmission involves only repeater transmissions with the non-overlapping groups, each group can be allocated with any RURUs or even the full bandwidth of the WLAN for their respective relay transmissions with the repeaters without regard to interference constraints.

According to embodiments of the present disclosure, the non-AP STAs are grouped based on their connectivity with the individual repeaters and the coverage regions of the repeaters. Based on the grouping, certain RUs can be reused for multiple groups without causing interference, thereby expanding the bandwidth of these groups. In this manner, the frequency resources of the WLAN can be used efficiently and the network throughput can be advantageously and significantly increased.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Figure 1:
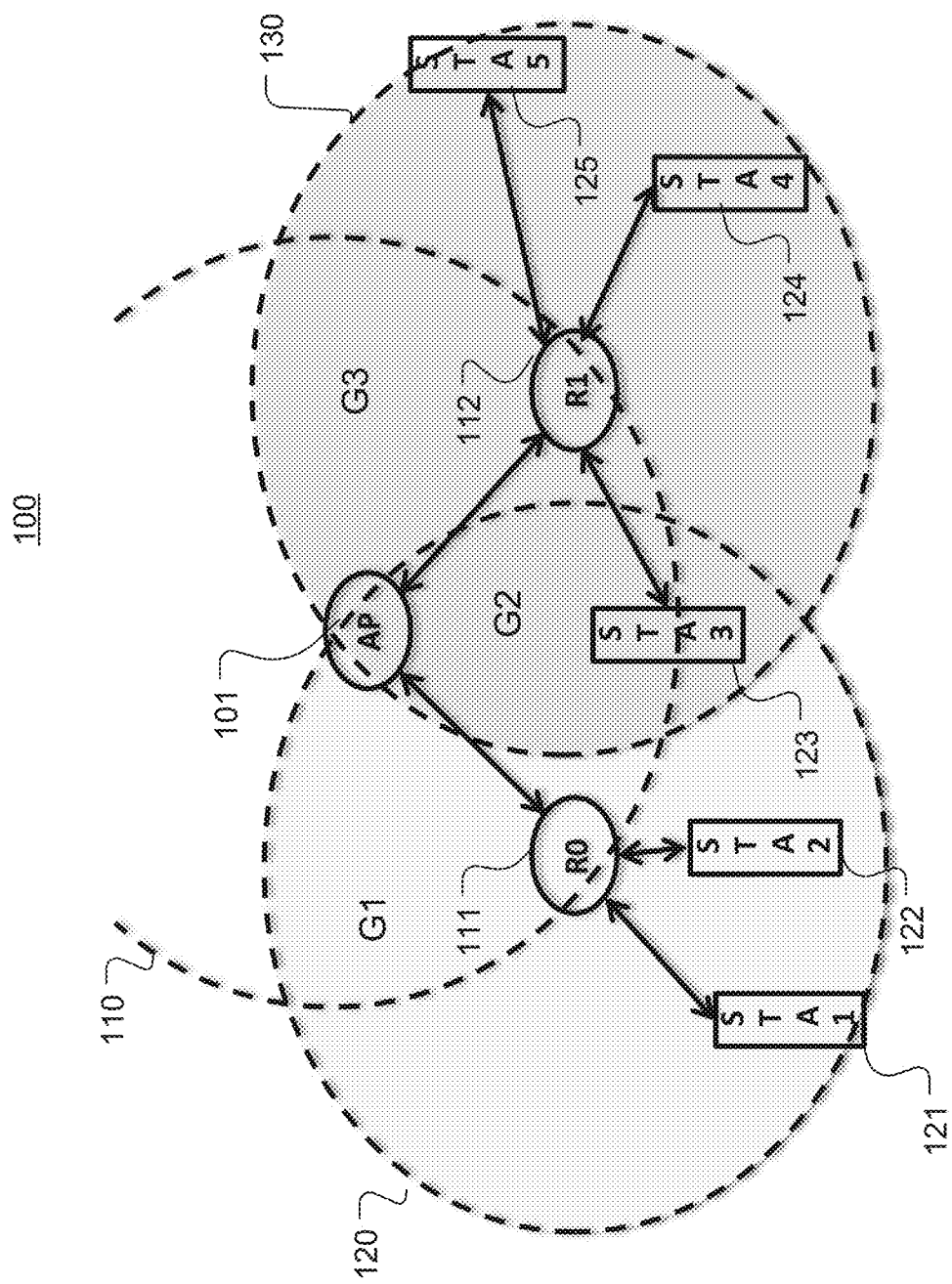
FIG. 1 illustrates the grouping of non-AP STAs in a DL relay transmission based on the radio coverage ranges of the repeaters in an exemplary WLAN in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

Spatial Reuse in WLAN Multi-AP Network

Herein, some embodiments the present disclosure are described with reference to "repeaters" or "repeater networks." However, the disclosed RU reuse and transmission mechanisms are applicable to coordinated devices and coordinated transmission networks of other various types as well. A coordinated transmission network or a coordinated wireless network comprises multiple coordinated devices (e.g., repeaters) that are communicatively coupled to a coordinating device (e.g., a coordinating access point (AP)). The transmissions between a coordinated device and one or more non-AP devices are referred as "coordinated transmission" herein.

Overall, embodiments of the present disclosure provide a spatial reuse mechanism for OFDMA relay transmissions between a repeater network and non-access point (non-AP) stations (STAs) in a wireless local area network (WLAN). The non-AP STAs are grouped based on their connectivity with the individual repeaters and the radio coverage regions of the repeaters. Each group is either (1) a non-overlapping group with the constituent non-AP STAs located in a non-overlapping coverage region of a particular repeater, or (2) an overlapping group with the constituent non-AP STAs located in an overlapping coverage region of two or more repeaters. Based on the grouping, certain RUs (or subchannels) are reused for multiple groups without causing interference, thereby expanding the bandwidths of these groups. This enables efficient reuse of frequency resources of the WLAN, and therefore the network throughput can be advantageously and significantly increased.

Embodiments of the present disclosure may use the Physical Layer Convergence Protocol (PLCP) protocol data unit (PPDU) structure as defined in the IEEE 802.11 family. However, the present disclosure is not limited to any specific packet formats or structures, nor limited to any specific industry standards or specifications.

Herein, the terms "coverage area," "coverage range" and "coverage region" are used interchangeably. A "coverage area," "coverage range," or "coverage region" of a wireless device may refer to the radio coverage area of the wireless device as a receiver or as a transmitter. The terms "frequency channel" and "frequency subchannel" are used interchangeably.

FIG. 1 illustrates the grouping of non-AP STAs in a DL transmission based on radio coverage ranges of the repeaters in an exemplary WLAN 100 in accordance with an embodiment of the present disclosure. In a simple configuration, the WLAN 100 includes an AP 101, two repeaters R0 111 and R1 112, and non-AP STAs 121-125. The dashed circles 110, 120 and 130 illustrate the radio coverage ranges of the AP 101 and the repeaters R0 and R1 (111 and 112) in DL transmissions respectively. As shown, some non-AP STAs are located outside the coverage region of the AP and thus cannot communicate with the AP directly. The repeaters R0 and R1 act as intermediary and operate to store and forward the traffic between the AP 101 and the non-AP STAs 121-125. In some embodiments, the repeater R0 111 and repeater R1 112 are neighboring APs working in a collaborative mode to enhance spatial re-use, where AP 101 is a coordinating device to facilitate such collaboration. As such, the repeaters R0 and R1 act as the coordinated device and the repeater network is a coordinated wireless network. Any further discussion in this disclosure is generally applicable to collaboration between multiple neighboring APs to spatial reuse enhancement. The collaborating function of AP 101 can also be performed by R0 or R1. For example R0 111 or R1 112 is embedded in or integrated with the AP device. In such case, transmission between AP 101 and its embedded repeater (R0 or R1) is within the device itself.

In a DL transmission, the AP 101 transmits DL data packets directed to the multiple non-STAs 121-125, and the packets are received and stored by the corresponding repeaters R0 and R1 (111 and 112). More specifically, the AP 101 sends a DL trigger frame which triggers the repeaters R0 and R1 (111 and 112) to simultaneously relay the DL data packets to the respective non-AP STAs in an OFDMA transmission opportunity (TXOP). The trigger frame specifies the RU allocation to each repeater/non-AP STA pair for the OFDMA relay transmission. In the case that R0 111 and R1 112 are neighboring APs coordinated by AP 101, AP 101 transmits a (coordinating) trigger frame which triggers the R0 111 and R1 112 to transmit their respective data to their non-AP STA devices.

In the illustrated example, the repeaters R0 and R1 (111 and 112) have an overlapping coverage region. According to embodiments of the present disclosure, the non-STAs 121-125 are classified into 3 groups. Group G1 includes STA 1 121 and STA2 122 located in the first non-overlapping coverage region covered by R0 111. Group G2 includes STA 3 123 located in the overlapping coverage region. Group G3 includes STA 4 124 and STA 5 125 located in the second non-overlapping coverage region covered by R1 112. This grouping applies to the transmission scenarios described with reference to FIGS. 2-4.

The repeaters R0 and R1 (111 and 112) can relay downlink (DL) and uplink (UL) data through OFDMA communications with the non-AP STAs 121-125. As described in greater detail below, allocation and reuse of the RUs can be determined based on grouping, which may be performed by the AP device in some embodiments. Similarly for collaborating neighbor APs, allocation and reuse of the RUs can be determined based on grouping, which may be performed by the coordinating AP device in some embodiments.

In the embodiments described in detail herein, the 5 non-AP STAs in the exemplary WLAN are grouped in the same manner for UL and DL transmissions. However, it will be appreciated that the radio coverage ranges of the AP and the repeaters in a UL transmission may be different than the ranges in a DL transmissions, e.g., due to different transmit powers. Accordingly, grouping of the non-STAs for DL and UL transmissions may be different.

The present disclosure is not limited to any specific metrics or parameters used to determine the grouping. In some embodiments, in a DL transmission, grouping may be based on the received power ratios by each non-AP STA from different repeaters. For example, each non-AP STA reports the received power ratios transmitted from each repeater to its associated repeater, and then indirectly to the AP. This information may be contained in a data packet preamble transmitted from the non-AP STA. The AP may group the non-AP STAs directly based on the received power or based on derived received power ratios from the repeaters, such as Signal-to-Noise Interference Ratios (SNIRs).

In some embodiments, channel state information (CSI) resulting from the sounding signals sent from the repeaters can be used in the spatial re-use transmission. More specifically, each repeater transmits a sounding signal to the non-AP STAs, and the non-AP STAs each feedback to the repeater the CSI which may include detailed channel metrics related to power and phase. The AP may determine the coordinated joint spatial re-use transmission scheme based on CSI of each subcarrier, CSI of each antenna of each repeater, or CSI of each resource unit (RU), etc. Such joint transmission scheme includes but not limited to the coordinated OFDMA RU allocation among repeaters, SRP-based transmit power control in conjunction with coordinated OFDMA RU allocation, or coordinated spatial nulling beamforming, or coordinated multi-user multiple input multiple output (MU-MIMO). For example, a WLAN includes two repeaters each having 4 antennas and 4 non AP-STAs each having one antenna. If both repeaters have full channel state information (8×4 complete channels), the repeaters can behave like a single AP in MU-MIMO with 8 antennas. Such a joint transmission may be initiated by a coordinating signal transmitted by the AP, for example in the form of a trigger frame.

In the example shown in FIG. 1, based on one of the metrics mentioned above or any other suitable metric, the AP determines that STA1 and STA2 (121 and 122) can hear R0 111 only, STA3 can hear both R0 and R1 (111 and 112), and STA4 and STA5 can hear R1 112.

As noted above, the AP can be implemented as a coordination function unit and included in the same device as one of the repeaters. In some other embodiment, the AP may be a stand-alone device or otherwise a separate device from any of the repeater.

Figure 2:
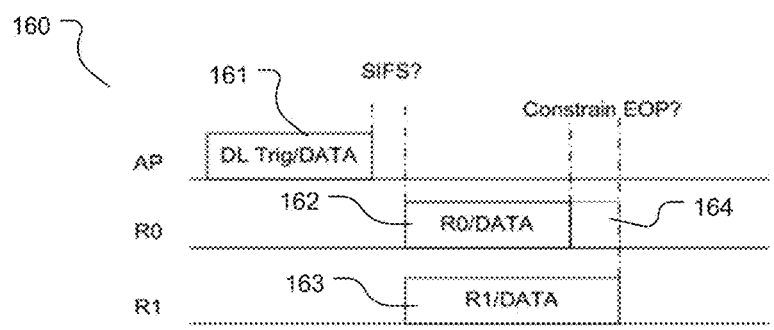
FIG. 2 illustrates an exemplary RU allocation method in a DL relay transmission scenario that the repeaters in the exemplary WLAN system only transmit data to non-overlapping groups in accordance with an embodiment of the present disclosure.
Figure 2:
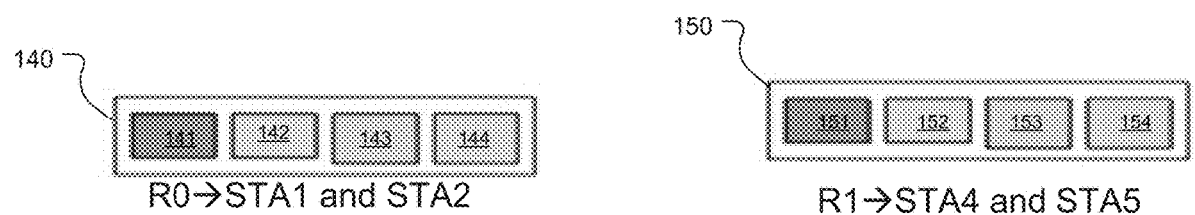
Figure 2:
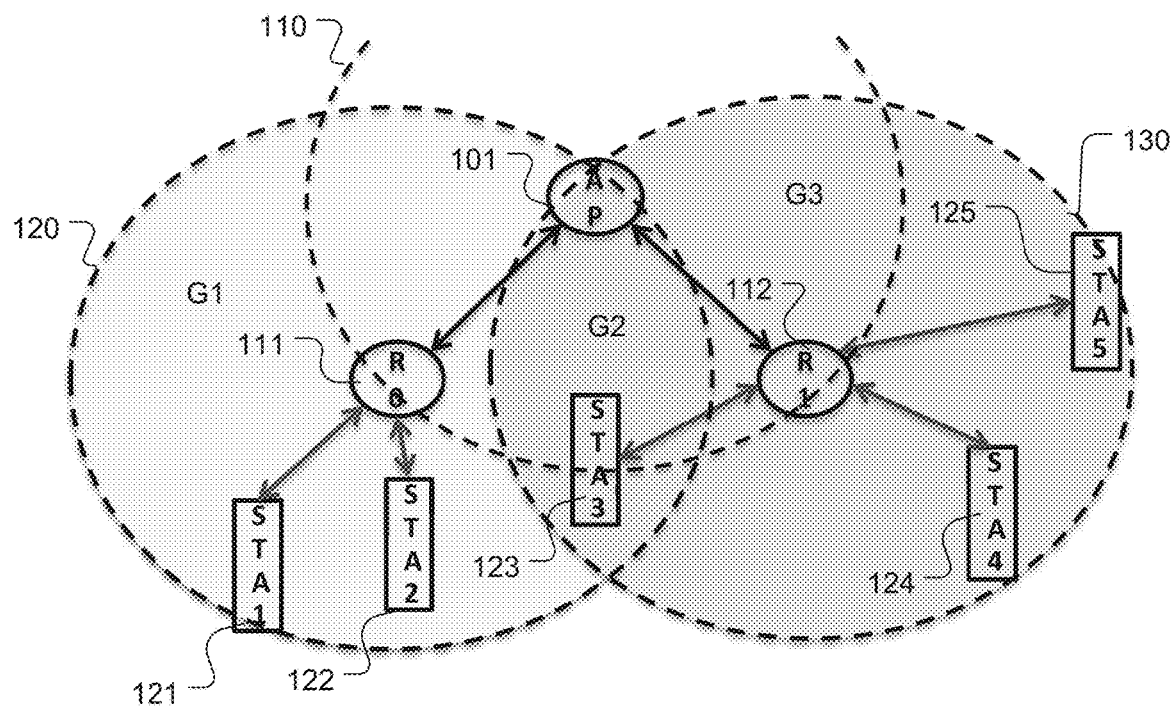

FIG. 2 illustrates an exemplary RU allocation method in a DL relay transmission scenario that the repeaters in the exemplary WLAN system 100 only transmit data to the non-overlapping groups in accordance with an embodiment of the present disclosure. In this scenario, the repeaters R0 111 and R1 112 respectively transmit data packets in OFDMA to the group G1 (STA1 121 and STA2 122) and the group G3 (STA4 124 and STA5 125). Since G1 and G3 are both non-overlapping groups, each group can be allocated with any RUs for the OFDMA relay transmission without regard to inter-group interference. The boxes 140 and 150 each represent the full bandwidth offered by the AP 101, and the boxes 141-144 and 151-154 represent the RUs allocated to the repeaters R0 111 and R1 112, respectively. In this example, each repeater transmits in OFDMA to the associated group by using the full bandwidth 140 or 150. As such, the throughput of the WLAN is maximized.

The timing diagram 160 shows the communication protocol for the OFDMA relay transmission. The AP transmits a DL trigger frame 161 to the repeaters R0 and R1. The trigger frame 161 contains the RU allocation information with respect to communication between each combination of repeater/non-AP STA. In response, the repeaters R0 and R1 transmit data packets 162 and 163 simultaneously in OFDMA and respectively to G1 and G3.

In some embodiment, the ends of data packets (EOP) are aligned, for example by dummy data padding 164 on the shorter packet 162. This can advantageously allow the non-AP STAs to transmit acknowledge frames (not shown) simultaneously.

It will be appreciated that the overlapping group G2 may include multiple non-AP STAs in some other embodiments. The repeaters R0 and R1 may each transmit to the corresponding STAs in G2 by using a different set of RUs. The RUs used by G2 are different from the RUs used by G1 and G2 to avoid interference.

Figure 3:
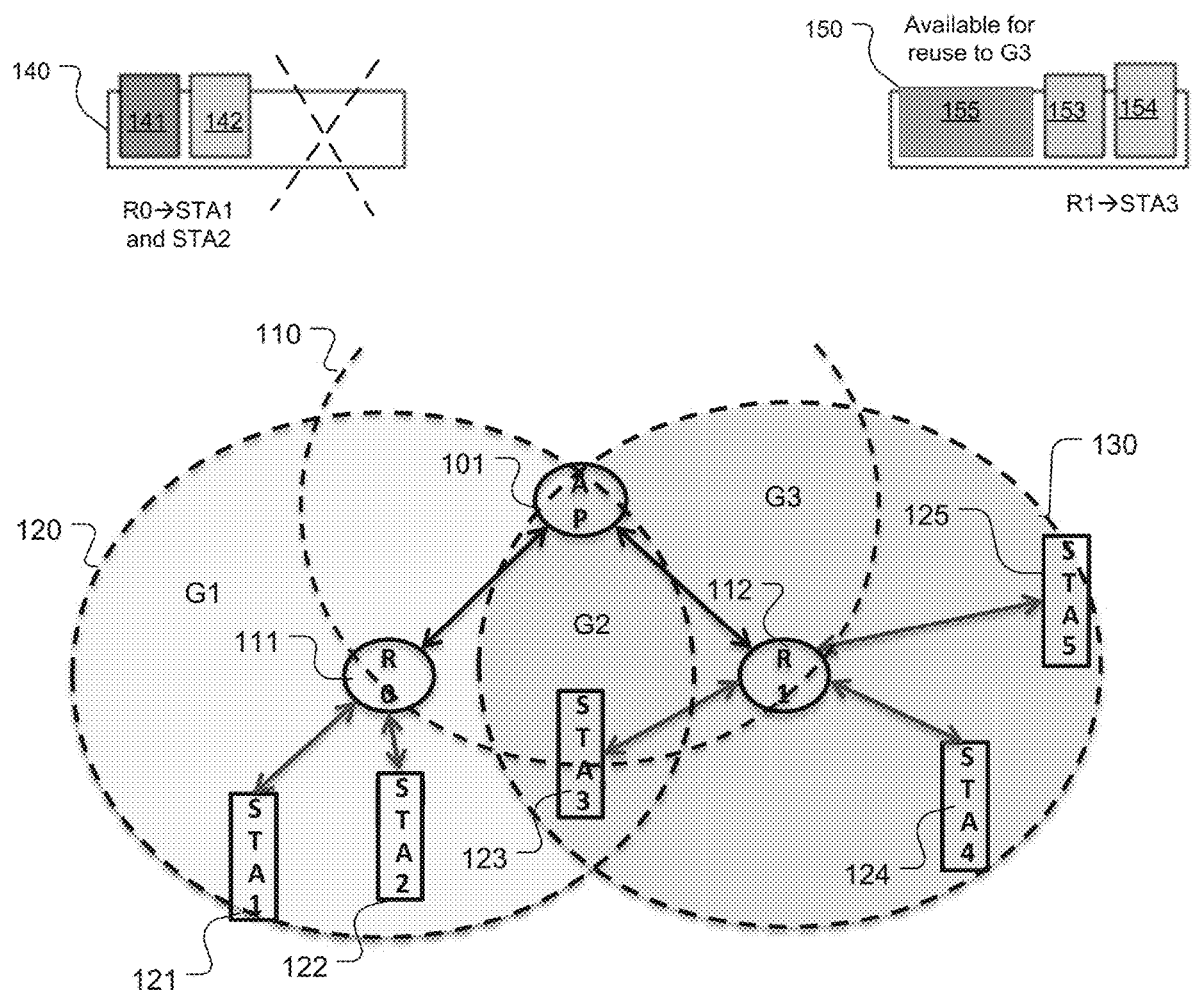
FIG. 3 illustrates an exemplary RU allocation and reuse method in a DL relay transmission scenario that the repeaters in the exemplary WLAN system transmit data to both non-overlapping and an overlapping groups in accordance with an embodiment of the present disclosure.

FIG. 3 illustrates an exemplary RU allocation and reuse method in a DL relay transmission scenario that the repeaters in the exemplary WLAN system 100 transmit data to both non-overlapping and overlapping groups in accordance with an embodiment of the present disclosure. In this scenario, the repeater R0 111 transmits data packets in OFDMA to the group G1 (STA1 121 and STA2 122) and the repeater R1 112 transmits data packets to the groups G2 (STA3 123) and G3 (STA4 124 and STA5 125).

In this scenario, the repeaters R0 and R1 use separate or non-overlapping RUs for OFDMA transmission to the group G1 and G2 to avoid interference from R0 to G2. For example, the repeater R0 is allocated with the RUs 141-142 for transmission to the group G1 (STA1 and STA2), and the repeater R1 is allocated with the RUs 153 and 154 for the OFDMA transmission to the group G1 (STA1 and STA2). The RUs 141-142 and 153-154 are exclusive of each other.

However, since there is no interference concern for G1 and G3, R1 can transmit to the group G3 (STA4 and STA 5 124-125) in OFDMA by reusing the same RUs that R0 uses for transmission to the group G1 (STA1 and STA2 121-122). Hence the RUs 155, which overlap the RUs 141-142, can be reused by R1 for transmission to the group G3.

Figure 4:
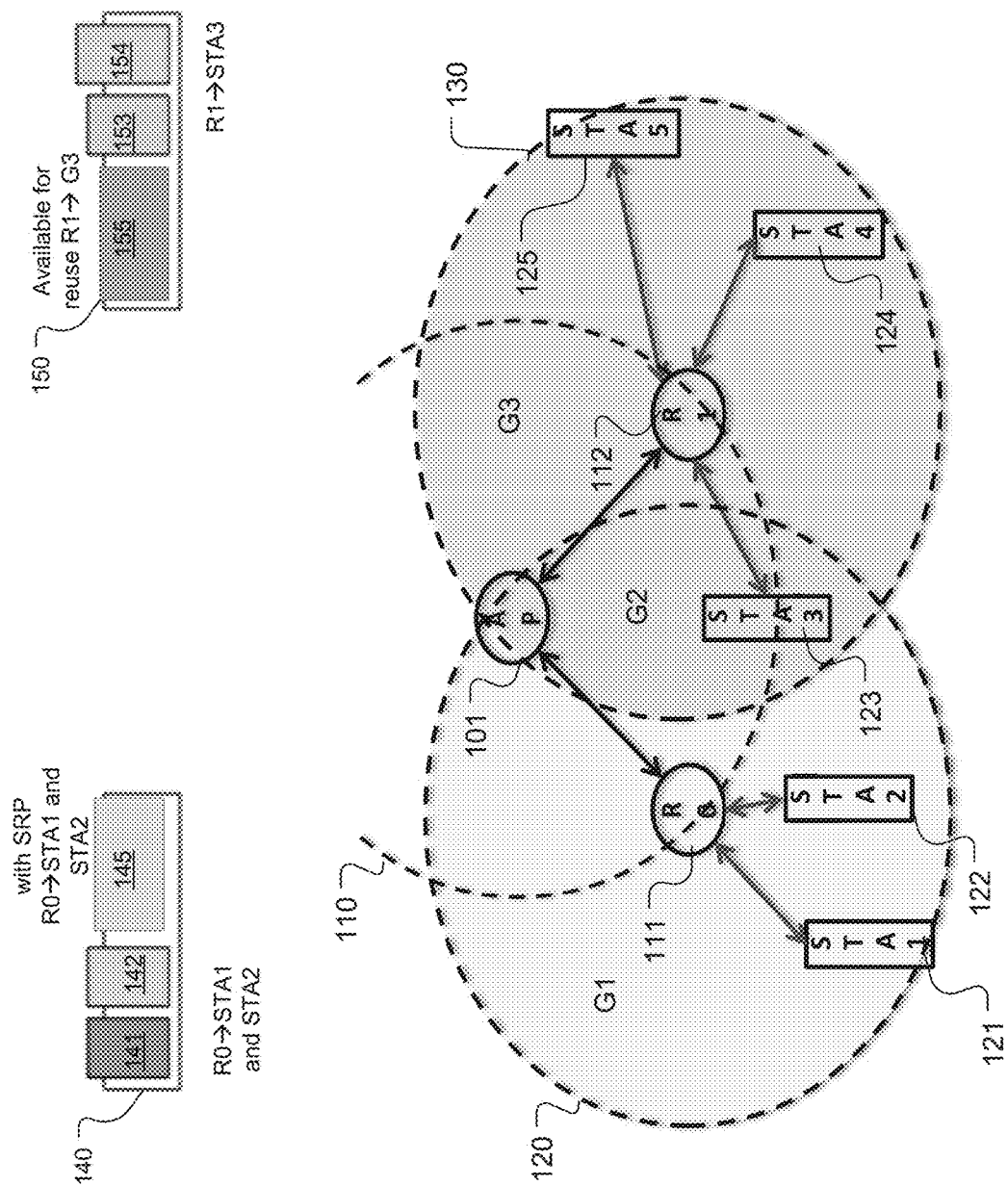
FIG. 4 illustrates an exemplary RU allocation and reuse method in combination with power adjustment in the DL relay transmission scenario as shown in FIG. 3.

FIG. 4 illustrates an exemplary RU allocation in combination with power adjustment method in the DL relay transmission scenario as shown in FIG. 3. In this scenario, in an OFDMA relay transmission, the repeater R0 111 transmits data packets to the group G1 (STA1 121 and STA2 122) and the repeater R1 112 transmits data packets to the groups G2 (STA3 123) and G3 (STA4 124 and STA5 125). The repeaters R0 and R1 (111-112) use separate RUs for the OFDMA transmission to the groups G1 and G2 to avoid interference from R0 to G2. R1 can transmit to G3 (STA4 and STA 5 124-125) in OFDMA by reusing the same RUs used by R0 for transmission to G1 (STA1 and STA2 121-122). Thus, the RUs 155, which overlap the RUs 141-142, can be used by R1 for transmission to the group G3.

In addition, the repeater R0 111 can also transmit to G1 by reusing the RUs used by R1 112 for OFDMA transmission to G2. As shown, R0 can use the RUs 145 (which overlaps the RUs 153-154 used by R1) as well as the RUs 141-142 for the relay transmission to G1. In some embodiments, in order to avoid inter-group interference between G1 and G2, one or both of the R0 111 and R1 112 can reduce the transmit power in the RUs. By transmit power control, selected RUs can be used for simultaneously relay transmission to an overlapping group and a non-overlapping group. As a result, further spatial and frequency reuse can be achieved in the repeater operations.

For example, the power adjustment may be based on a Spatial Reuse Parameter (SRP) protocol from the IEEE 802.11ax specifications and standards. In one embodiment, the SRP may be included in a reserved spatial reuse field in the SIG-A field of a high efficiency (HE)-PPDU. Alternatively, the SRP can be carried as an information element in the repeater operation, instead of in the SIG-A field. For example, the repeater R0 111 may obtain the SRP information by hearing from a prior UL transmission from the STA3 123 to the repeater R1 112.

Figure 5:
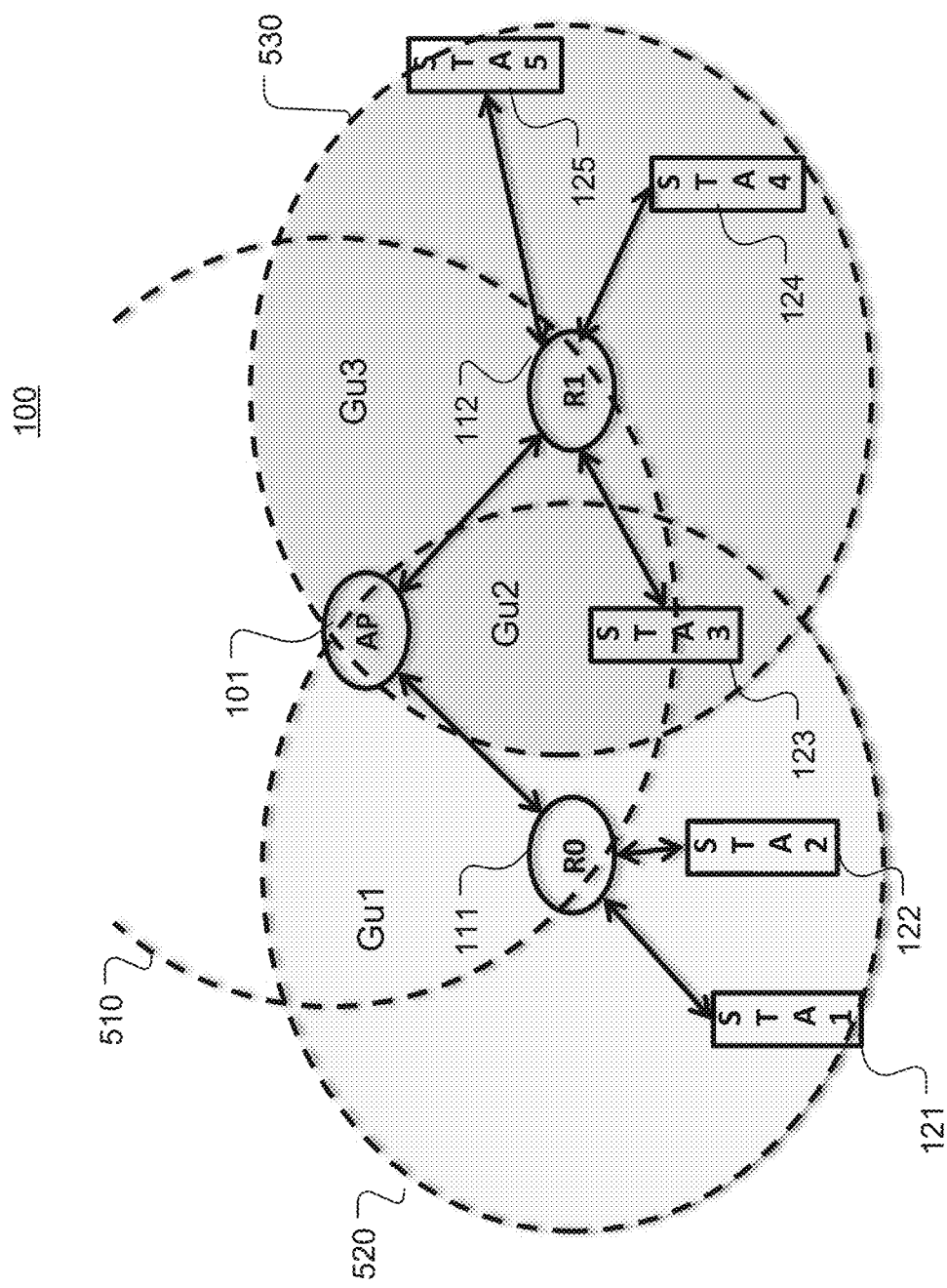
FIG. 5 illustrates the grouping of non-AP STAs in a UL transmission based on the radio coverage ranges of the repeaters in the exemplary WLAN in accordance with an embodiment of the present disclosure.

FIG. 5 illustrates the grouping of non-AP STAs in a UL relay transmission based on the radio coverage ranges of the repeaters in an exemplary WLAN 100 in accordance with an embodiment of the present disclosure. The dashed circles 510, 520 and 530 illustrate the radio coverage ranges of the AP 101 and the repeaters R0 and R1 (111 and 112) respectively in the UL transmission.

In some embodiments, UL transmission grouping may be based on the received power by each repeater from an associated non-AP STA. For example, each repeater reports to the AP the received power transmitted from a non-AP STA. This information may be contained in a preamble in a data packet transmitted from the repeater. The AP may group the non-AP STAs directly based on the received power or based on derived received power ratios from different non-AP STAs, such as Signal-to-Noise Interference Ratios (SNIRs).

In this example, based on received STA power or any other suitable metric, the AP 101 determines that only the repeater R0 111 can hear STA1 121 and STA2 122, both R0 and R1 (111 and 112) can hear STA3 123, and only R1 112 can hear STA4 and STA5. Hence, the repeaters R0 and R1 (111 and 112) have an overlapping coverage region for the UL relay transmission. According to embodiments of the present disclosure, the non-AP STAs 121-125 are classified into 3 groups. Group Gu1 includes STA 1 121 and STA2 122 located in the first non-overlapping coverage region. Group Gu2 includes STA 3 123 located in the overlapping coverage region. Group Gu3 includes STA 4 124 and STA 5 125 located in the second non-overlapping coverage region covered by R1 112. This grouping applies to the scenarios described with reference to FIGS. 6-8.

Figure 6:
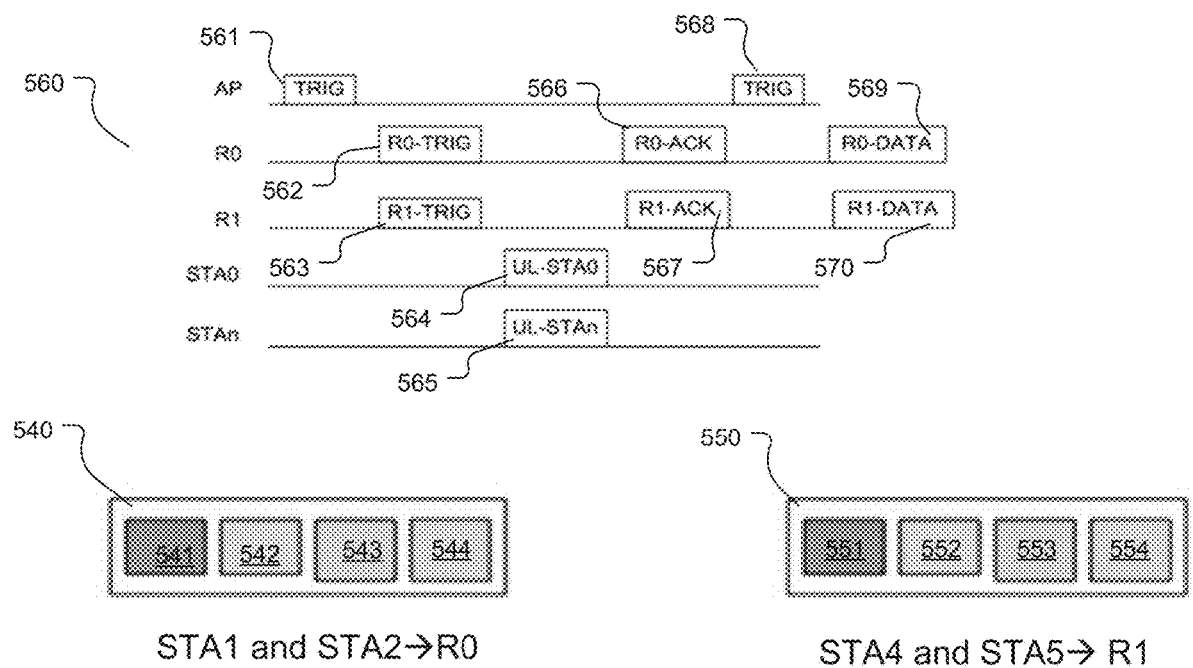
FIG. 6 illustrates an exemplary RU allocation method in an UL relay transmission scenario that only the non-overlapping groups transmit to the repeaters in the exemplary WLAN system in accordance with an embodiment of the present disclosure.
Figure 6:
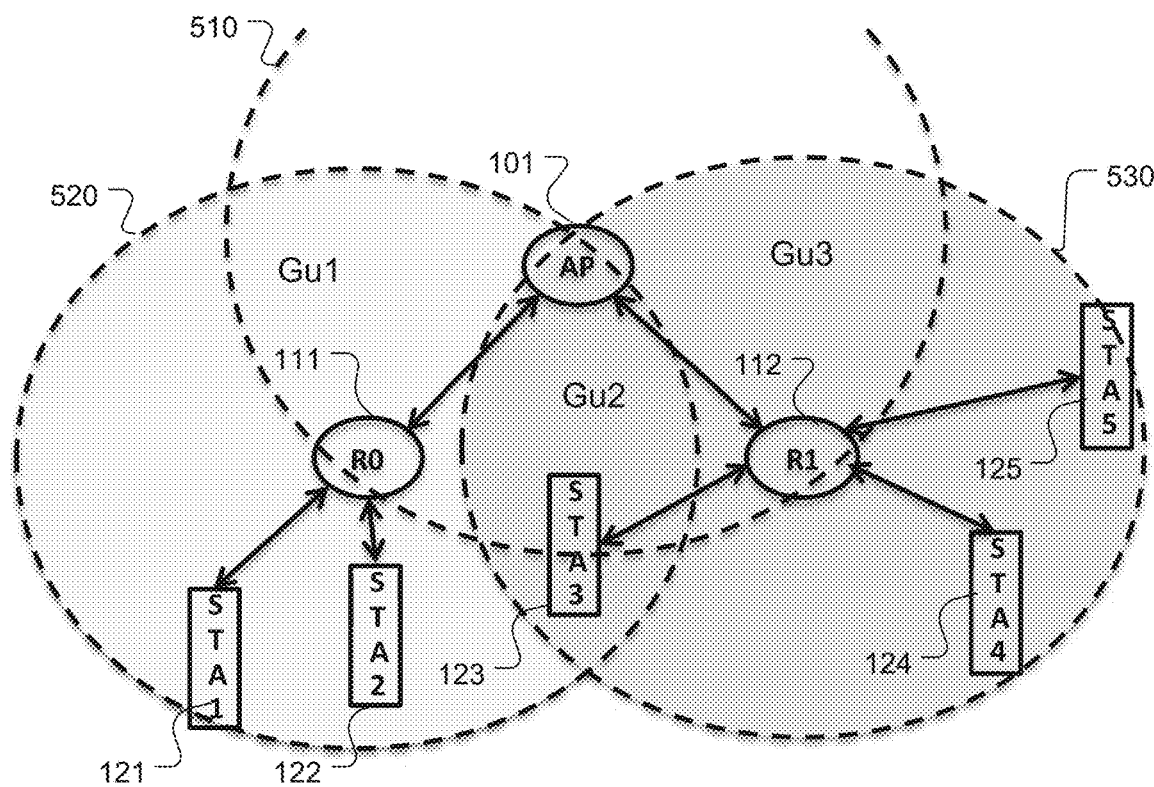

FIG. 6 illustrates an exemplary RU allocation and reuse method in an UL relay transmission scenario that only the non-overlapping groups transmit to the repeaters in the exemplary WLAN system 100 in accordance with an embodiment of the present disclosure. In this scenario, the STA 1 and the STA2 121-122 (Gu1) transmit data packets in OFDMA to the repeater R0 111, the STA4 124 and the STA5 125 (Gu3) transmit data packets in OFDMA to the repeater R1 112.

Since Gu1 and Gu3 are both non-overlapping groups, each group can be allocated with any RUs for the OFDMA relay transmission without regard to inter-group interference. The boxes 540 and 550 represent the full bandwidth offered by the AP (not explicitly shown) for UL transmissions, and the boxes 541-544 and 551-554 represent the frequency subchannels allocated to the Gu1 and Gu2 respectively. In this example, each group transmits in OFDMA to the associated repeater by using the full bandwidth, and therefore the throughput of the WLAN is advantageously maximized.

As shown in the timing diagram 560, in some embodiments, the AP 101 sends a UL trigger frame 561 to the repeaters R0 and R1, which specifies the RU allocation to each repeater/non-AP STA pair for the subsequent UL OFDMA relay transmission. Receiving the UL trigger frame from the AP 101, the repeaters R1 and R2 (111 and 112) each send a trigger frame (562 or 563) to the associated non-AP STAs and thereby relay the RU allocation information to the non-AP STAs. In response, the non-AP STAs simultaneously transmit UL data packets (564-565) to the repeaters R0 and R1 in OFDMA by using their respective allocated RUs. Upon receiving the UL data packets (564-565), the repeaters R0 and R1 send acknowledge (ACK) frames 566-567 to the non-AP STAs. The AP sends another trigger frame 568 to the repeaters R0 and R1 which triggers the repeaters R1 and R2 to transmit the UL data packets (569 and 570) to the AP.

It will be appreciated that the overlapping group Gu2 may include multiple non-AP STAs in some other embodiments. The repeaters R0 and R1 may each receive from the corresponding STAs in Gu2 by using a different set of RUs. The RUs used by G2 are different from the RUs used by G1 and G2 to avoid interference.

Figure 7:
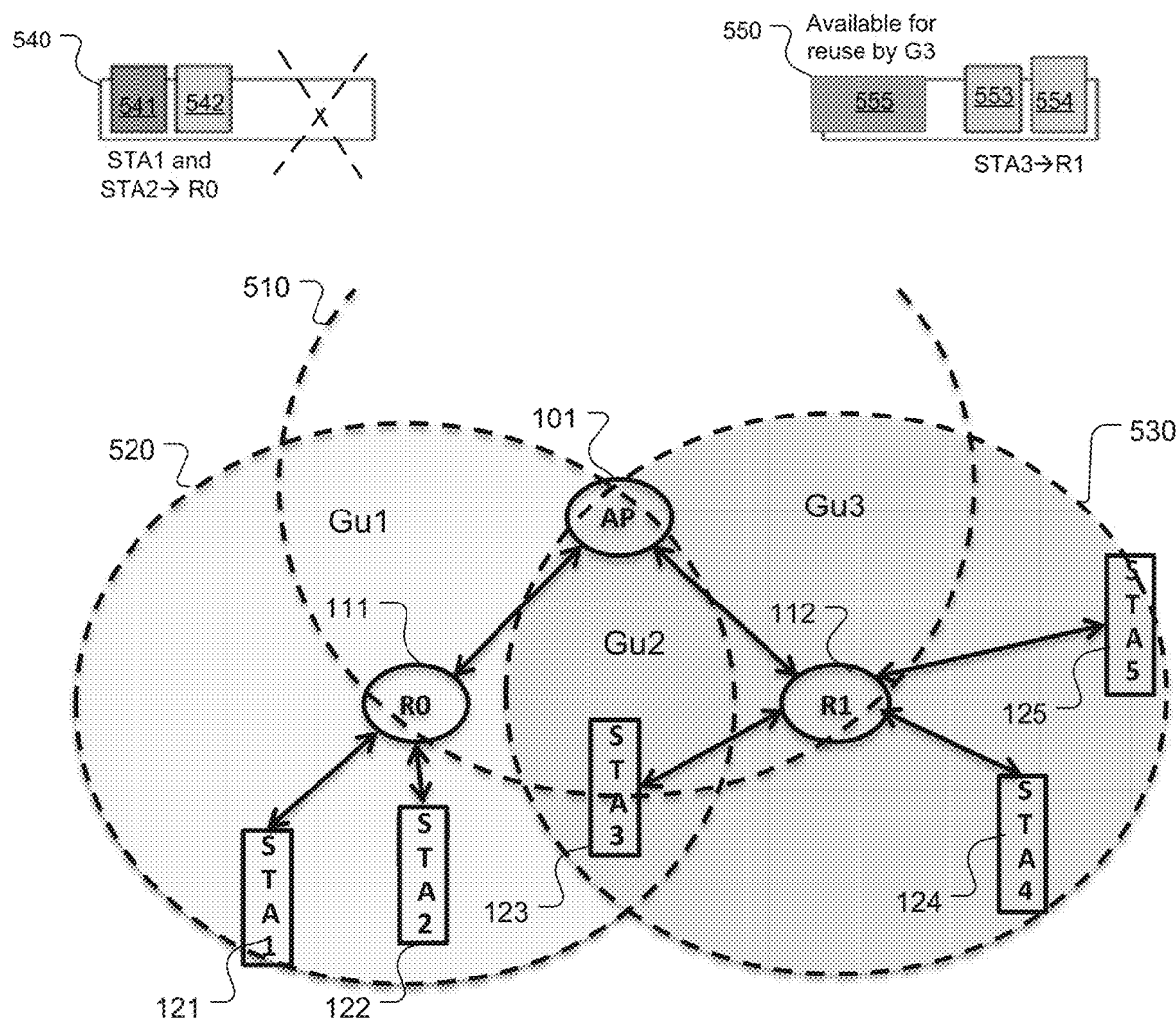
FIG. 7 illustrates an exemplary RU allocation and reuse method in an UL relay transmission scenario that both non-overlapping groups and an overlapping group in the exemplary WLAN system transmit data to the repeaters in accordance with an embodiment of the present disclosure.

FIG. 7 illustrates an exemplary RU allocation and reuse method in an UL relay transmission scenario that both non-overlapping groups and the overlapping group in the exemplary WLAN system 100 transmit data to the repeaters in accordance with an embodiment of the present disclosure. In this scenario, the group Gu1 (STA1 121 and STA2 122) transmits data packets in OFDMA to the repeater R0 111, and the groups Gu2 (STA3 123) and Gu3 (STA4 124 and STA5 125) transmits data packets to the repeater R1 112.

The groups Gu1 and Gu2 use separate RUs for OFDMA transmission to the repeaters R0 and R1 respectively to avoid inter-group interference. For example, Gu1 (STA1 121 and STA2 122) is allocated with the RUs 541-542 for the OFDMA transmission to the repeater R0 111, and the group Gu2 (STA3 123) is allocated with the RUs 153 and 154 for the OFDMA transmission to the repeater R1 112. The frequency subchannels 541-542 and 553-554 are exclusive of each other.

However, since there is no interference concern for Gu1 and Gu3, the group Gu3 (STA4 and STA 5 124-125) can transmit to the repeater R1 112 in OFDMA by reusing the same RUs used by the group Gu1 (STA1 and STA2 121-122) for transmission to the repeater R0 111. Thus, the RUs 555, which overlap the RUs 541-542, can be used in UL transmission from the group Gu3 to the repeater R1 112.

Figure 8:
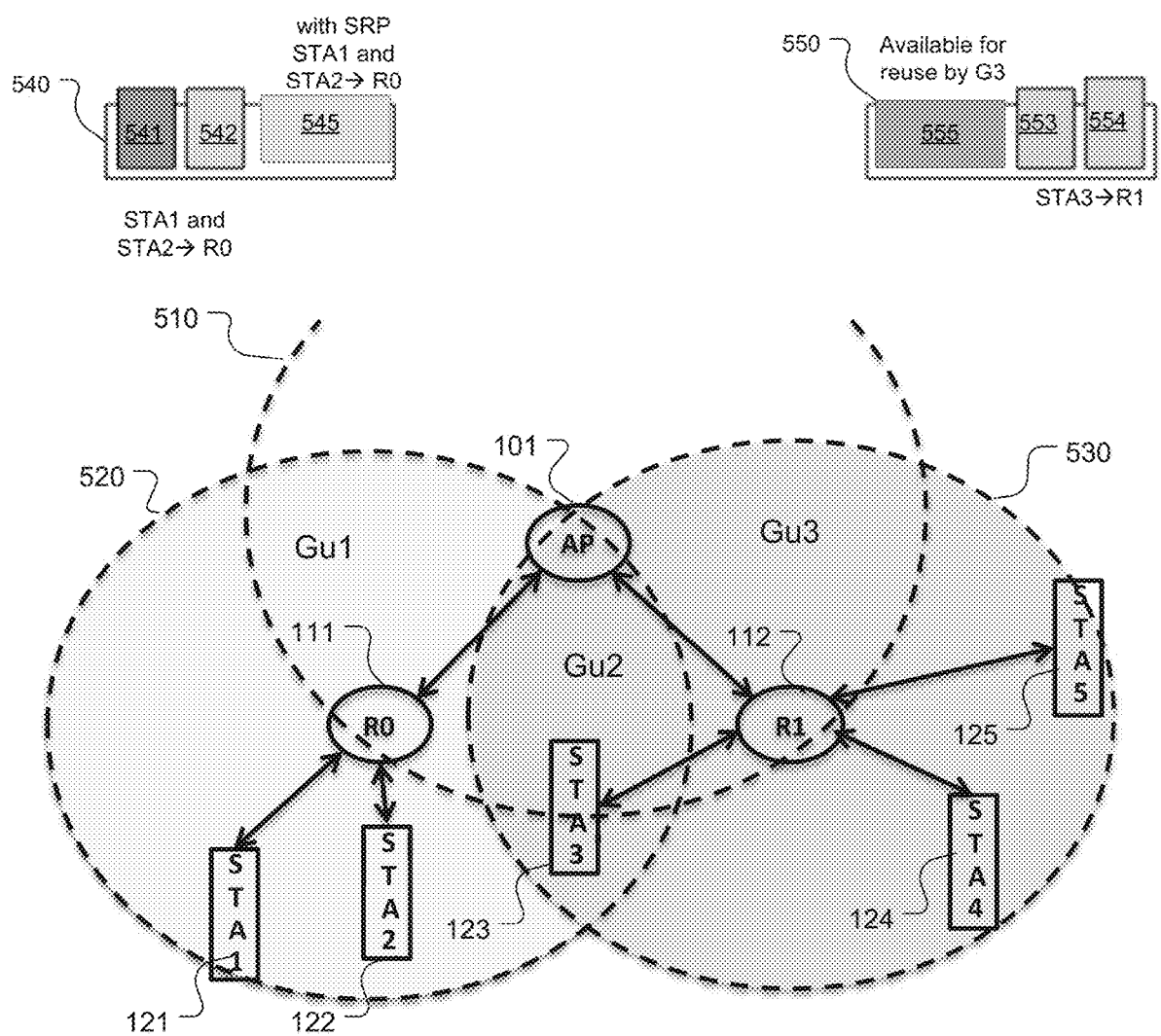
FIG. 8 illustrates an exemplary RU allocation and reuse method in combination with power adjustment in the UL relay transmission scenario as shown in FIG. 7.

FIG. 8 illustrates an exemplary RU allocation and reuse method in combination with power adjustment in the UL relay transmission scenario as shown in FIG. 7. In this scenario, the group Gu1 (STA1 121 and STA2 122) transmits data packets in OFDMA to the repeater R0 111, and the groups Gu2 (STA3 123) and Gu3 (STA4 124 and STA5 125) transmit data packets to the repeater R1 112.

The groups Gu1 and Gu2 use separate RUs for OFDMA transmission to the repeaters R0 and R1 respectively to avoid inter-group interference. The group Gu3 (STA4 and STA 5 124-125) can transmit to the repeater R1 112 in OFDMA by reusing the same RUs used by the group Gu1 (STA1 and STA2 121-122) for transmission to the repeater R0 111.

In addition, Gu2 can also transmit to the repeater R1 112 by reusing the RUs used by Gu1 for the OFDMA transmission to the repeater R0 111. As shown, Gu1 can use the RUs 545 (which overlaps the RUs 553-554 used by Gu2) as well as the RUs 541-542 for the OFDMA relay transmission to the group Gu1. In some embodiments, in order to avoid inter-group interference between Gu1 and Gu2, STA3 can reduce the transmit power in the RUs 553 and 554. Alternatively or in parallel, STA 1 and STA2 can reduce the transmit power in the RUs 545. Thus, by transmit power control, certain RUs can be reused for simultaneously relay transmission to an overlapping group and a non-overlapping group. As a result, further spatial and frequency reuse can be achieved in the repeater operations.

The power adjustment may be based on a Spatial Reuse Parameter (SRP) protocol in IEEE 802.11ax standards. In one embodiment, the SRP may be included in a reserved spatial reuse field in the SIG-A field of a high efficiency (HE)-PPDU. Alternatively, the SRP can be carried as an information element (instead of the SIG-A field) in the repeater operation. For example, STA3 123 may obtain the SRP information by hearing from a prior DL transmission from the repeater R0 to the group Gu1.

Figure 9:
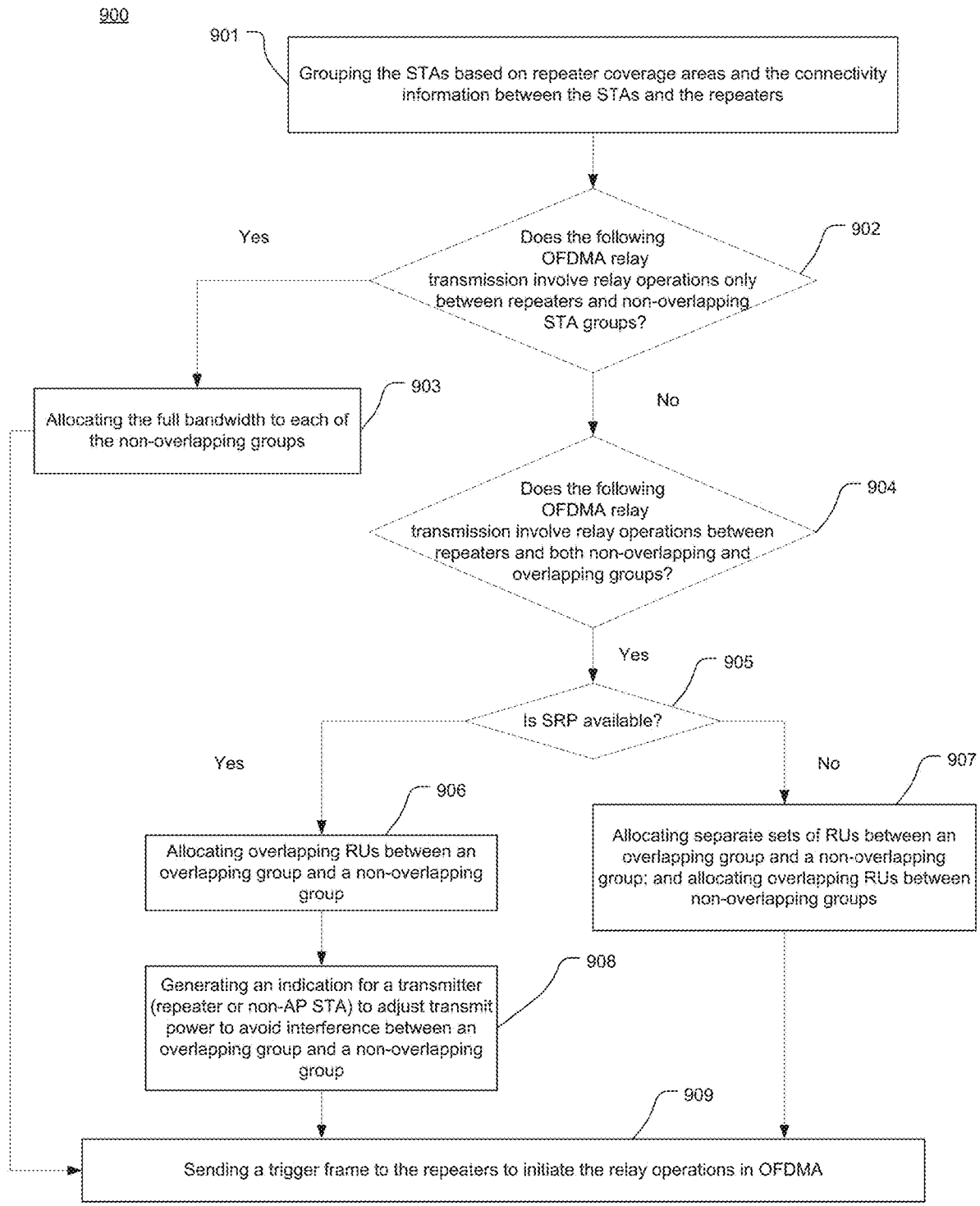
FIG. 9 is a flow chart depicting an exemplary process of allocating and reusing RUs for an OFDMA relay transmission between a repeater network and non-AP STAs in a WLAN in accordance with an embodiment of the present disclosure.

FIG. 9 is a flow chart depicting an exemplary process 900 of allocating and reusing RUs for an OFDMA relay transmission between a repeater network and non-AP STAs in a WLAN in accordance with an embodiment of the present disclosure. Process 900 may be performed by an AP STA or an AP functional module and can be implemented in hardware, software, firmware or a combination thereof. The OFDMA relay transmission refers to a DL or UL TXOP between the repeater network and the non-AP STAs. The non-AP STAs in the WLAN may be grouped in different manners for UL and DL transmissions.

At 901, the non-AP STAs are grouped based on repeater coverage areas and the connectivity information between the non-AP STAs and the repeaters. Thus, each non-AP STA is associated with either an overlapping group or a non-overlapping group. For a DL transmission, the grouping is based on which repeater or repeaters that each non-AP STA can hear. For a UL transmission, the grouping is based on which non-AP STA(s) each repeater can hear. The ability to "hear" is determined based on one or more channel metrics, such as received power ratio and the CSI of a particular channel granularity, as described in greater detail with reference to FIGS. 1 and 5.

At 902, it is determined if the OFDMA relay transmission involves relay operations between repeaters and only non-overlapping groups. If yes, the AP allocates the full bandwidth to each of the non-overlapping group, as described in greater detail with reference to FIGS. 2 and 6. As a result, the AP sends a trigger frame to the repeaters to initiate the OFDMA relay transmission, as described in greater detail with reference to the timing diagram 160 in FIG. 2 and the timing diagram 560 in FIG. 6.

On the other hand, if it is determined at 904 that the OFDMA relay transmission involves relay operations between repeaters and both overlapping and non-overlapping groups, it is further determined at 905 whether SRP is available for power adjustment. If yes, overlapping RUs can be allocated between an overlapping group and a non-overlapping group at 906, as described in greater detail with reference to FIGS. 4 and 8. At 908, an indication is generated for a transmitter to adjust the transmit power to avoid interference between an overlapping group and a non-overlapping group. The transmitter is a repeater in the case of a DL transmission and a non-AP STA in the case of a UL transmission. As a result, at 909, the AP sends a trigger frame to the repeaters to initiate the OFDMA relay transmission.

If the SRP is not available as determined at 905, separate sets of RUs are allocated between an overlapping group and a non-overlapping group to avoid interference. However, non-overlapping groups can be allocated with overlapping RUs. As a result, at 909, the AP sends a trigger frame to the repeaters to initiate the OFDMA relay transmission.

Figure 10:
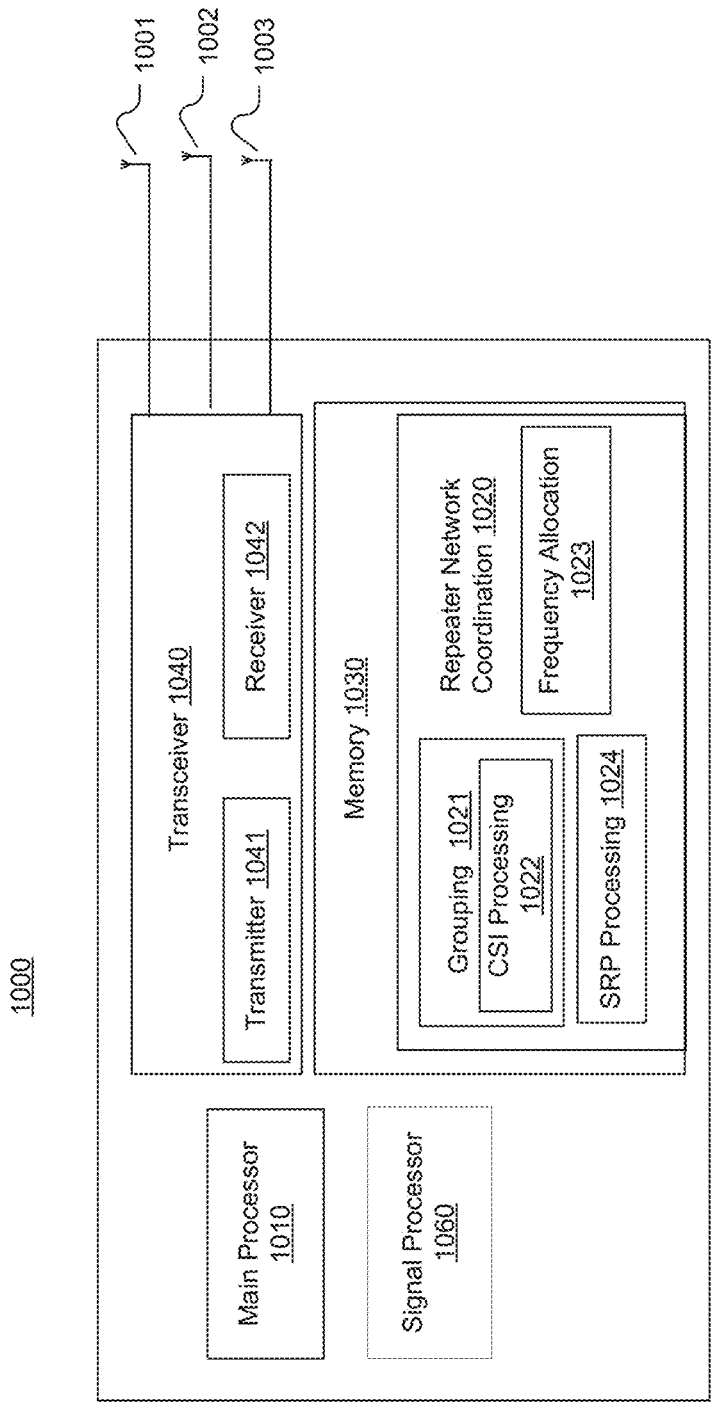
FIG. 10 is a block diagram illustrating the configuration of an exemplary wireless communication device operable to efficiently allocate and reuse RUs for OFDMA relay operations based on non-AP STA grouping in a WLAN according to an embodiment of the present disclosure.

FIG. 10 is a block diagram illustrating the configuration of an exemplary wireless communication device 1000 operable to efficiently allocate RUs for OFDMA relay transmissions based on non-AP STA grouping in accordance with an embodiment of the present disclosure. The device 1000 may be an AP STA or a device that integrates an AP coordination module.

The device 1000 includes a main processor 1010, a memory 1030, a signal processor 1060 and a transceiver 1040 coupled to an array of antenna 1001-1003. The memory 1030 includes a repeater network coordination module 1020 that stores processor-executable instructions for allocating and reusing RUs for OFDMA relay transmissions based on non-AP STA grouping, as described in greater detail with reference to FIGS. 1-9. In some other embodiments, the coordination module 1020 is stored in a memory within the transceiver 1040. Particularly, the coordination module 1020 includes a grouping module 1021 for grouping the non-AP STAs based on CSI information processing performed by the CSI processing module 1022. The coordination module 1020 includes a RU allocation module for allocating the RUs, which includes reusing selected RUs based on grouping.

The transceiver 1040 includes a transmitter 1041 with various module configured to generate and transmit data packets or control frames or any other type of communication transmission units. For instance, it has a transmit First-In-First-Out (TX FIFO), an encoder, a scrambler, an interleaver, a constellation mapper, an inversed discrete Fourier transformer (IDFT), and a GI and windowing insertion module. The receiver 1042 has various modules configured to receive data packets or control frames or any other type of communication transmission units. For example, it includes a receive First-In-First-Out (RX FIFO), a synchronizer, a channel estimator, an equalizer, a decoder, a demapper, a deinterleaver, a fast Fourier transformer (FFT), and a descrambler.

It will be appreciated that the transceiver 1040 may include a wide range of other suitable components that are well known in the art. The various components in the device 1000 can be implemented in any suitable manner that is well known in the art and can be implemented using hardware logic, software logic or a combination thereof.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of wireless communication; said method comprising:
    at a wireless communication device, assigning a plurality of non-access-point (non-AP) stations (STAs) into a set of groups, wherein:
        an AP is configured to serve said plurality of non-AP STAs through a coordinated transmission network comprising a first coordinated device and a second coordinated device;
        said first coordinated device and said second coordinated device have an overlapping coverage area with respect to a first Orthogonal Frequency-Division Multiple Access (OFDMA) transmission; and
        said set of groups comprises: an overlapping group located within said overlapping coverage area; and a first non-overlapping group and a second non-overlapping group located outside said overlapping coverage area;
    allocating a first set of resource units (RUs) for a first coordinated transmission operation between said first coordinated device and a first set of non-AP STAs in said first non-overlapping group;
    allocating said first set of RUs for a second coordinated transmission operation between said second coordinated device and a second set of non-AP STAs in said second non-overlapping group;
    allocating a second set of RUs for a third coordinated transmission operation between said second coordinated device and a third set of non-AP STAs in said overlapping group, wherein said first set and said second set of RUs are exclusive of each other, and wherein each set of said first, said second and said third sets of non-AP STAs comprises one or more non-AP STAs, wherein said first, said second and said third coordinated transmission operations are simultaneous;
    initiating said first Orthogonal Frequency-Division Multiple Access (OFDMA) transmission comprising said first, said second and said third coordinated transmissions, wherein said first OFDMA transmission is a downlink transmission;
    further allocating said second set of RUs for said first coordinated transmission operation in said first OFDMA transmission; and
    adjusting a transmit power of said first coordinated device associated with said first coordinated transmission operation in said first OFDMA transmission based on a spatial reuse parameter carried in a prior uplink transmission from a non-AP STA in said overlapping group to said second coordinated device.

2. The method of claim 1, wherein said allocating said first set of RUs is based on first information indicating that: said first set of non-AP STAs is within a coverage area of said first coordinated device and outside said overlapping coverage area; and said second set of non-AP STAs is within said overlapping coverage area, wherein said first information originates from said first set of non-AP STAs and said second set of non-AP STAs and comprises one of: a received power ratio; a Signal-to-Interference-plus-Noise Ratio (SINR); and Channel Status Information (CSI).

3. The method of claim 1, wherein said first OFDMA transmission is a downlink transmission from said coordinated transmission network to said plurality of non-AP STAs.

4. The method of claim 3, wherein said plurality of non-AP STAs are assigned into a different set of groups during an uplink OFDMA transmission from said plurality of non-AP STAs to said coordinated transmission network, wherein said different groups comprise an overlapping group and a non-overlapping groups.

5. The method of claim 1, wherein said first OFDMA transmission is an uplink transmission from said plurality of non-AP STAs to said coordinated transmission network.

6. The method of claim 1, wherein said set of groups further comprises a fourth set of non-AP STAs in said overlapping group, and further comprising allocating said a third set of RUs for a fourth coordinated transmission operation between said first coordinated device and said fourth set of non-AP STAs, wherein said first OFDMA transmission further comprises said fourth coordinated transmission operation, wherein said first, said second and said third sets of RUs are exclusive of each other.

7. The method of claim 1, further comprising:
further allocating said first set of RUs for said third coordinated transmission operation in said first OFDMA transmission; and
adjusting a transmit power used for said third coordinated transmission operation based on a spatial reuse parameter carried in a prior downlink transmission from said first coordinated device to a non-AP STA in said first non-overlapping group.

8. The method of claim 1, further comprising transmitting a coordinating signal to initiate a coordinated nulling, transmission between said plurality of non-AP STAs and said coordinated transmission network.

9. The method of claim 1, and further comprising transmitting a coordinating signal to initiate a coordinated Multi-User-Multiple Input Multiple Output (MU-MIMO) transmission between said plurality of non-AP STAs and said coordinated transmission network.

10. The method of claim 1, further comprising:
allocating both said first and said second sets of RUs for:
a fifth coordinated transmission operation between said first coordinated device and a set of non-AP STAs comprised in said first non-overlapping group; and
a sixth coordinated transmission operation between said second coordinated device and a set of non-AP STAs comprised in said second non-overlapping group; and
initiating a second OFDMA transmission comprising said fifth and said sixth coordinated transmission operations.

11. The method of claim 1 further comprising aligning ends of packets transmitted in said first coordinated transmission operation and said second coordinated transmission operation.

12. The method of claim 1, further comprising transmitting a trigger frame to initiate said OFDMA transmission.

13. A wireless communication device comprising:
a memory;
a processor coupled to said memory;
an antenna; and
a transceiver comprising a signal processor and coupled to said processor, said memory and said antenna, wherein said memory stores instructions that, when executed by said processor, causing said wireless communication device to perform a method of:
assigning a plurality of non-access-point (non-AP) stations (STAs) into a set of groups, wherein:
a coordinating AP STA is configured to serve said plurality of non-AP STAs through a coordinated wireless network comprising a first coordinated device and a second coordinated device;
said first coordinated device and said second coordinated device have an overlapping coverage area; and
said set of groups comprises: an overlapping group located within said overlapping coverage area; and a first non-overlapping group and a second non-overlapping group located outside said overlapping coverage area;
allocating first set of RUs for a first coordinated operation between said first coordinated device and a first set of non-AP STAs in said first non-overlapping group;
allocating said first set of RUs for a second coordinated transmission operation between said second coordinated device and a second set of non-AP STAs in said second non-overlapping group;
allocating a second set of RUs for a third coordinated transmission operation between said second coordinated device and a third set of non-AP STAs in said overlapping group, wherein said first set and said second set of RUs are exclusive of each other, and wherein each set of said first set, said second set and said third set of non-AP STAs comprises one or more non-AP STAs;
initiating a first Orthogonal Frequency-Division Multiple Access (OFDMA) transmission comprising said first, said second and said third coordinated transmission operations, wherein said first OFDMA transmission is a downlink transmission;
further allocating said second set of RUs for said first coordinated transmission operation in said first OFDMA transmission; and
adjusting a transmit power of said first coordinated device associated with said first coordinated transmission operation in said first OFDMA transmission based on a spatial reuse parameter carried in a prior uplink transmission from a non-AP STA in said overlapping group to said second coordinated device.

14. The wireless communication device of claim 13, wherein said allocating said first set of RUs is based on first information indicating that: said first set of non-AP STAs are within a coverage area of said first coordinated device and outside said overlapping area; and said second set of non-AP STAs are within said overlapping coverage area, wherein said first information originates from said first set non-AP STAs and said second set of non-AP STAs and comprises one of: a received power ratio; a Signal-to-Interference-plus-Noise Ratio (SINR); and Channel Status Information (CSI).

15. The wireless communication device of claim 13, wherein said first OFDMA transmission is a downlink transmission from said coordinated wireless network to said plurality of non-AP STAs.

16. The wireless communication device of claim 15, wherein said plurality of non-AP STAs are assigned into a different set of groups during an uplink OFDMA transmission by using said first coordinated device and said second coordinated device.

17. The wireless communication device of claim 13, wherein said first OFDMA transmission is an uplink transmission from said plurality of non-AP STAs to said coordinated wireless network.

18. The wireless communication device of claim 13, wherein said plurality of non-AP STAs further comprises a fourth set of non-AP STAs in said overlapping group, and wherein said method further comprises allocating said a third set of RUs for a fourth coordinated transmission operation between said first coordinated device and said fourth set of non-AP STAs, wherein said first OFDMA transmission further comprises said fourth coordinated transmission operation, wherein said first, said second and said third sets of RUs are exclusive of each other.

19. The wireless communication device of claim 13, wherein said method further comprises:
further allocating said first set of RUs for said third coordinated transmission operation in said first OFDMA transmission; and
adjusting a transmit power used for said third coordinated transmission operation based on a spatial reuse parameter carried in a prior downlink transmission from said first coordinated device to a non-AP STA in said first non-overlapping group.

20. The wireless communication device of claim 13, wherein said method further comprises:
allocating both said first and said second sets of RUs for:
 a fifth coordinated transmission operation between said first coordinated device and a set of non-AP STAs comprised in said first non-overlapping group; and
 a sixth coordinated transmission operation between said second coordinated device and a set of non-AP STAs comprised in said second non-overlapping group; and
initiating a second OFDMA transmission comprising said fifth and said sixth coordinated transmission operations.

21. The wireless communication device of claim 13, wherein said method further comprises aligning ends of packets transmitted in said first relay operation and said second relay operation.

22. A method of wireless communication, said method comprising:
at a wireless communication device, assigning a plurality of non-access-point (non-AP) stations (STAs) into a set of groups, wherein:
 an AP is configured to serve said plurality of non-AP STAs through a coordinated transmission network comprising a first coordinated device and a second coordinated device;
 said first coordinated device and said second coordinated device have an overlapping coverage area with respect to a transmit power control transmission; and
 said set of groups comprises: an overlapping group located within said overlapping coverage area; and a first non-overlapping group located outside said overlapping coverage area;
adjusting a transmit power used in at least one of: a first Orthogonal Frequency-Division Multiple Access (OFDMA) transmission operation between said first coordinated device and a first set of non-AP STAs in said first non-overlapping group; and a second OFDMA transmission operation between said second coordinated device and a second set of non-AP STAs in said overlapping group; and
initiating said transmit power control transmission comprising: said first OFDMA transmission operation; and said second OFDMA transmission operation, wherein said adjusting mitigates interference between said first OFDMA transmission operation and said second OFDMA transmission operation, wherein each set of said first set and said second set of STAs comprises one or more non-AP STAs, and wherein the said adjusting is based on Spatial Reuse Parameters (SRP).

23. The method of claim 22, wherein said adjusting are based on first information indicating that: said first set of non-AP STAs is within a coverage area of said first coordinated device and outside said overlapping coverage area; and said second set of non-AP STAs are within said overlapping coverage area, wherein said first information originates from said first set of non-AP STAs and said second set of non-AP STAs and comprises one of: a received power ratio; a Signal-to-Interference-plus-Noise Ratio (SINR); and Channel Status Information (CSI).

* * * * *